United States Patent [19]

Utzmann et al.

[11] 4,217,163
[45] Aug. 12, 1980

[54] ADVANCING ARRANGEMENT WITH ADJUSTABLE STEPWISE ADVANCING DISTANCE

[75] Inventors: René Utzmann, Meuden; Jean M. Dronet, Falaise, both of France

[73] Assignee: Sté d'Application Plastique, Mecanique et Electronique Plastimecanique S.A., Falaise, France

[21] Appl. No.: 946,599

[22] Filed: Sep. 28, 1978

[30] Foreign Application Priority Data

Oct. 1, 1977 [DE] Fed. Rep. of Germany ....... 2744280

[51] Int. Cl.² .............................................. B32B 31/00
[52] U.S. Cl. ........................................ 156/361; 53/51; 226/32; 226/142
[58] Field of Search ...................... 156/361; 226/8, 27, 226/32, 137, 139, 141, 142, 165, 166, 158; 83/241, 244–246, 277; 53/51

[56] References Cited

U.S. PATENT DOCUMENTS

| | | | |
|---|---|---|---|
| 1,437,059 | 11/1922 | Huestis | 226/141 |
| 2,614,456 | 10/1952 | Zeuthen | 226/160 X |
| 3,000,157 | 9/1961 | Ollieu et al. | 53/184 |
| 3,908,331 | 9/1975 | Donnet | 53/51 X |
| 4,048,782 | 9/1977 | Hamilton | 226/32 X |

FOREIGN PATENT DOCUMENTS 2235280 1/1974 Fed. Rep. of Germany .

*Primary Examiner*—David A. Simmons

[57] ABSTRACT

In a hot forming machine in which molding means deform a thermoplastic foil band and cutting and stamping means further process the deformed foil band. A photocell is adapted to scan marking indicia on the foil band and to adjust a lengthwise adjustable connecting member in accordance with such scanning. The connecting member forms part of an advancing arrangement for the transported foil band. This advancing arrangement includes a swing arm pivotally mounted in the machine; a first shaft mounted on the swing arm in proximity of the free end thereof; and an eccentric rigidly secured to the first shaft and pivotally connected to the connecting member which is also pivotally connected to the swing arm.

3 Claims, 3 Drawing Figures

4,217,163

ADVANCING ARRANGEMENT WITH ADJUSTABLE STEPWISE ADVANCING DISTANCE

BACKGROUND OF THE INVENTION

The present invention relates to an advancing arrangement for the stepwise advancing of a transported foil band. This foil band is precisely positioned in a processing arrangement wherein the foil band is precisely guided to a molding arrangement and a cutting or stamping arrangement in a heat forming machine. The forming machine includes an advancing mechanism which stepwise slidably advances the foil band and a scanning arrangement which controls the advancing mechanism in dependence and the coincidence of a register marking on the foil band.

In German published application No. 2254715, which corresponds to U.S. Pat. No. 3,908,331 coassigned to the assignee of the present invention there is disclosed a known advancing mechanism of the aforedescribed type. In this known arrangement two clamping mechanisms are stepwise actuated and have carrier elements which are integrally connected to each other. These carrier elements and clamping arrangement are operated by a common driving arrangement. The first clamping mechanism is longitudinally slidably mounted on its carrier element and is provided with an adjustable actuating element which is controlled by a scanning arrangement adapted to scan indicia impressed on a foil band that in turn controls the slidable advancement of the carrier element.

In this known advancing arrangement, both clamping mechanisms are disposed in the direction of advance in the foil band upstream relative to a heated region of the foil band material and also downstream from this heated region relative to the direction of the advancement of the foil band material. The clamping mechanisms are moved with the same advancing distance synchronously in a stepwise manner. In order to center the pressure-impression zone, one of the two clamping arrangements is slidably adjusted relative to the other clamping arrangement with the aid of a scanning arrangement for scanning indicia impressed on a foil band material and is stretched between both clamping mechanisms.

In this known advancing arrangement it is therefore necessary to stretch the foil band material without additionally changing anything in the stepwise advancing distance.

In this manner there can be obtained a centering of the indicia impression with respect to a stationary forming arrangement, on the condition that no changes in the foil band material occur between the forming arrangement and the cutting or stamping arrangement which is mounted at a distance of several times the distance of stepwise advancement in order to avoid the necessity of making corrections regarding the stepwise advancing distance.

SUMMARY OF THE INVENTION

It is a general object of this invention to provide an advancing mechanism of the aforedescribed type which makes it possible to control the stepwise advancing distance by means of a scanning arrangement which permits the maintenance of a register stability for a molding arrangement and a cutting or stamping arrangement, wherein the advancing arrangement can be used singly or in combination with a foil band stretching arrangement.

The advancing arrangement in accordance with this invention is particularly simple in construction and finds application in an arrangement having mechanical driving means for the shafts which support swing arms and which are pivoted by means of a rotating cam disc.

This arrangement obtains a register stability without stretching the foil band material. This constitutes an important advantage in that the orientation of the formed container still remaining in the foil band material with respect to a cutting or stamping arrangement can be more easily carried out. In particular, this orientation can be carried out when, for the register stability, there is supplied an impression on the foil band material with respect to a forming arrangement, whereby the register stability is then attainable by means of additional mechanisms for example those disclosed in German published application No. 2254715 and U.S. Pat. No. 3,908,331.

BRIEF DESCRIPTION OF THE DRAWING

Further objects and advantages of the invention will be apparent from the following description of a typical embodiment in preferred form, taken in connection with the attached drawings, in which.

DETAILED DESCRIPTION OF A PREFERRED EMBODIMENT

Figure 1:
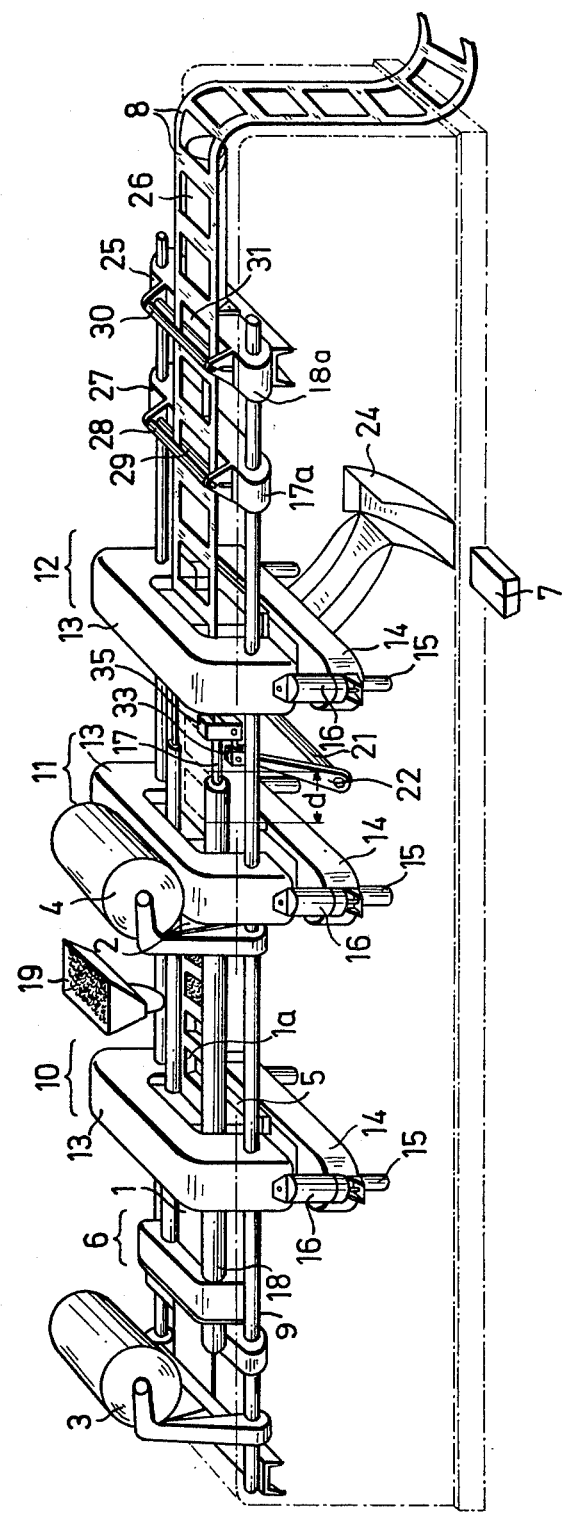
FIG. 1 is a schematic view in perspective of a heat forming and molding machine having the advancing arrangement in accordance with the invention.
Figure 3:
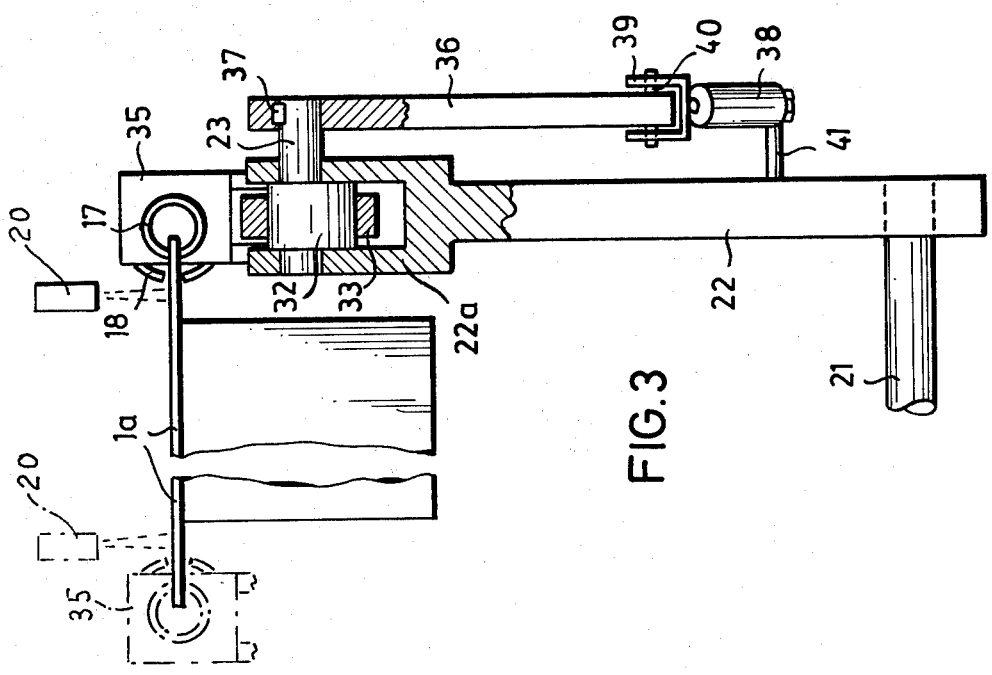
FIG. 3 is an end elevational view of the portion of the advancing arrangement illustrated in FIG. 2.
Figure 2:
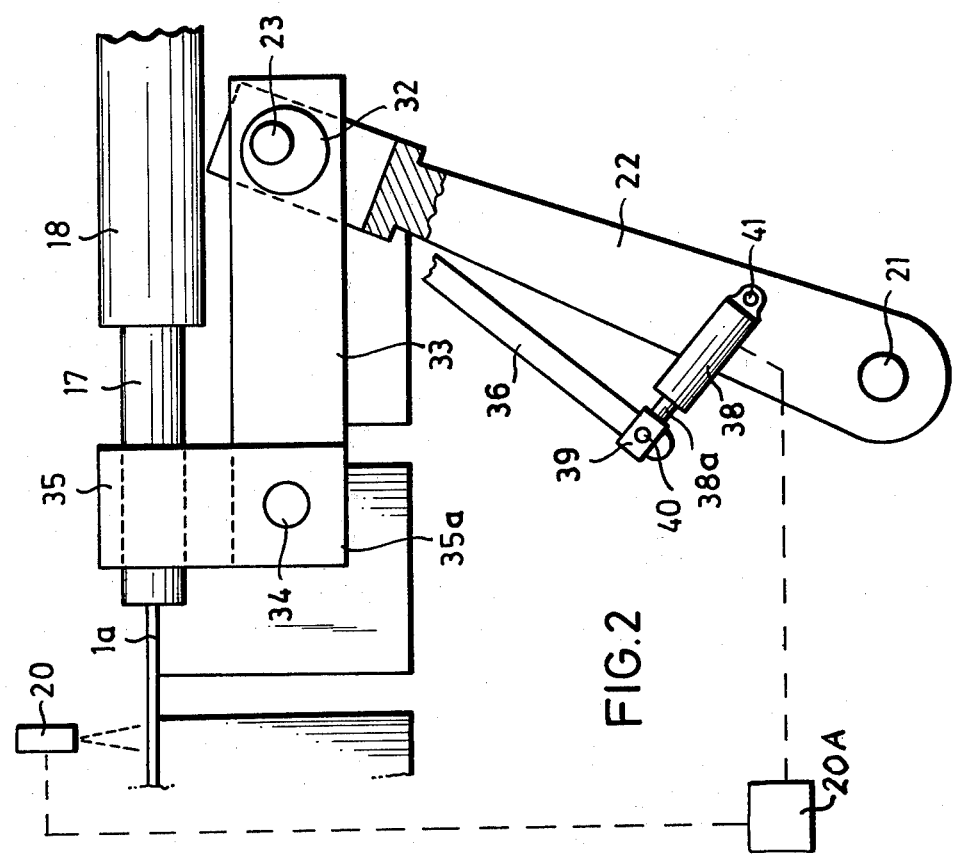
FIG. 2 is a side elevational view of a portion of the advancing arrangement.

There is illustrated in FIG. 1 a deep-draw machine which corresponds in its construction and operation substantially to that disclosed in German Pat. No. 1145784 which corresponds to U.S. Pat. No. 3,000,157. A detailed description of the construction and function of the various elements of the machine have therefore not been included in the specification. The aforementioned German Pat. No. 1145784 and corresponding U.S. Pat. No. 3,000,157 are incorporated by reference into the instant application. The deep-draw forming machine in accordance with FIG. 1 includes a foil band 1 made of thermoplastic foil band material which is paid out from a storage roller 3, then first traverses a heating arrangement 6 and a molding or forming arrangement 10 from which a molded and formed foil band 1a exits.

The forming and molding arrangement 10 produces cavities in the foil band 1a into which material is fed by means of a filling arrangement 19. Downstream from this filling arrangement there is mounted a second storage roller 4 from which a strip 2 is paid out and is welded to the top of the foil band 1a in a welding arrangement 11 for purposes of sealingly covering the top of the foil band 11. Downstream therefrom the formed and sealed foil band 1a is fed into a punching and ejecting arrangement 12, 14 from whence the containers 7 are punched out of the formed foil band 1a so that there remains now a grate-like foil band remainder 8 which is transported out of the arrangement and disposed of as a waste product.

The individual working and processing mechanisms of this deep-draw machine are slidably adjustably mounted on a pair of guide rods 9 and can be selectively fixed on preselected positions thereon so that the various distances between the individual mechanisms can be adjusted in accordance with the size of the containers 7 to be punched out.

The deforming and molding arrangement 10, the welding arrangement 11 and the punch-out and ejection arrangement 12, 24 are all essentially identically mounted and each has a bracket 13 spanning the space between the pair of guide rails 9 and being slidably mounted thereon by means of suitable bores. These brackets 13 are furthermore mounted on slidably displaceable base plates 14. The brackets 13 have downwardly extending columns 15 which are movable in mating bores of the base plate 14. Each of the aforedescribed supporting arrangements also includes a pair of pneumatic or hydraulic cylinders 16 which are connected to the base plates 14 and the corresponding brackets 14 to resiliently support the brackets 13 on the base plates 14. In the molding arrangement 10 the punch which serves to deform the foil band 1a into the shape of a container is designated with the reference number 5. A clamping arrangement 18 is mounted in the region of the lateral edges of the foil band 1 and the deformed foil band 1a upstream from the molding arrangement 10 and extends up to shortly upstream from the punch-out and ejection mechanism 12. The clamping arrangement 18 coacts with an advancing mechanism 17 and the construction and function of the advancing arrangement 17 and the clamping arrangement 18 are described in detail in German published patent application No. 2235280. The detailed construction and function of the clamping arrangement 18 and advancing arrangement 17 is therefore not described in this application in detail. German published application No. 2235280 is incorporated by reference herein. It is to be understood that the advancing arrangement 17 and the clamping arrangement 18 both grip the foil band 1 and the deformed foil band 1a at their respective edges. The advancing arrangement 17 is longitudinally slidably displaceable and effects the advance of the foil band 1 and the deformed foil band 1a. The clamping arrangement 18 holds the foil band 1 and the deformed foil band 1a, whereas the advancing arrangement 17 after effecting a stepwise advance of the foil band 1, 1a returns to its original position.

An auxiliary advancing arrangement 17a is mounted downstream from the punch-out and ejection mechanism 12 and effects the advance of the grate-like remainder foil band 8. The auxiliary advancing arrangement 17a consists of a holder 27 which is slidably mounted on the guide rails 9 by means of hydraulic- or pneumatic-working cylinder 26.

The holder 27 includes a pair of parallel rollers 28, 29 between which the remainder-foil band 8 is guided. The rollers 28, 29 are freely rotatably mounted on the holder 27 so that the rollers 28, 29 can rotate when the holder 27 is moved oppositely to the advance movement of the foil band towards the left, as viewed in FIG. 1, whereas the remainder-foil band 8 clamped between the rollers 28 and 29 is entrained in the direction of advance when the holder 27 is slidably moved towards the right by means of the hydraulic- or pneumatic-working cylinder 26.

A clamping arrangement 18a prevents the remainder foil band 8, during the return movement of the auxiliary advancing arrangement 17a, to be entrained and moved backwardly and to therefore bulge out between the punch-out and ejection arrangement 12 and the auxiliary advancing arrangement 17a. The clamping arrangement 18a is constructed in a manner analogous to that of the auxiliary advancing arrangement 17a and also has a holder 25 movably mounted on the pair of guide rods 9 on which it can be fixedly clamped to simultaneously serve as a support for the hydraulic-pneumatic-working cylinder 26. The holder 25 is also provided with a pair of parallel rollers 30, 31 between which the remainder-foil band 8 is guided. The rollers 30, 31 also are freely rotatably mounted on the holder 25, whereby this pair of rollers 30, 31 acts in the reverse sense with respect to the auxiliary advancing arrangement 17a. Coacting with the clamping arrangement 18a they securely hold the remainder-foil-band 8 during the return movement of the auxiliary advancing arrangement 17a and this pair of rollers permits the sliding therethrough of the remainder-foil-band 8 when the auxiliary advancing arrangement 17a moves in the direction of advancement.

The step distance corresponds to the distance d which is the distance between the containers formed in the deformed foil band 1a and requires no change if the foil band 1 is made of a homogeneous material that has a permanent uniform quality which also does not expand during heating or shrink during cooling. Since this is obviously an unattainable goal, the advancing arrangement is constructed in such a way that the step distance is adjustable. For this purpose, the drive for the advancing arrangement 17 consists of a shaft 21 disposed transversely to the advancing arrangement 17. A pair of swing arms 22 are secured to the shaft 21 and have forks 22a at the opposite end from the pivot connection. A pushrod 33 is mounted in each fork 22a in a manner to be described in detail hereinbelow. The other end of the push rod 33 is mounted in a fork 35a of a clamp box 35 by means of a pin 34. The clamp box 35 is fixedly secured to the advancing arrangement 17 so that a slidable displacement of the clamp box 35 is effected by a pivotal displacement of the swing arm 22 and a slidable displacement of the advancing arrangement 17 thereby causing an advance of the foil band 1 and the foil band 1a.

The pivot angle of the swing arm 22 is determined so that it corresponds to the theoretic step distance which in turn corresponds to the theoretic distance d of the foil band 1a. In order to change this fixed step distance there is provided in the fork 22a an eccentrically mounted shaft 23 which is secured to an eccentric disc 32 serving as a hinge for the push rod 33. An actuating lever 36 is mounted nonrotatably on the shaft 23 by means of a key 37. The free end of the actuating lever 36 is pivotally connected to a fork 39 by means of a pin 40. The fork 39 forms the free end of a piston rod 38a forming part of an actuating element that is in the form of a hydraulic-respectively pneumatic-working cylinder 38. The hydraulic-respectively pneumatic-working cylinder 38 is pivotally secured to the swing arm 22 by means of a pin 41.

The manner of operation of the advancing arrangement of the invention is as follows:

During normal operation the pivoting of the swing arm 22 causes the stepwise advance of the foil band 1, the deformed foil band 1a and the remainder-foil band 8. The position of the container forming part of the deformed foil band 1a in relation to the punch-out and ejection mechanism 12, 24 is controlled by means of a photocell 20. For this purpose there are provided registration marks on the cover strip 2. When a deviation from the registration marks in relation to the photocell 20 is detected, then the photocell 20 adjusts via an illustrated control circuit 20A the hydraulic-respectively pneumatic-working cylinder 38.

If deviations from the registration marks occur relative to the photocell 20, the photocell adjusts by means of the non-illustrated control circuit the hydraulic-respectively pneumatic-working cylinder 38, whereby the actuating lever 36 is pivoted in the clockwise direction until the maximum stroke of the hydraulic-respectively pneumatic-working cylinder 38 is reached. By means of this pivotal movement of the actuating lever 36 the eccentric disc 32 is rotated which effects a lengthening of the advancing step of the advancing arrangement 17. As soon as the advancing movement of the advancing arrangement 17 is terminated and the foil band 1 and the deformed foil band 1a is fixedly held by means of the clamping arrangement 18 the swing arms 22 and the thereto connected advancing arrangement 17 return to their original position as well as the hydraulic-respectively pneumatic-working cylinder 38. Thereafter a new advancing cycle can be begun whereby, depending whether the photocell 20 detects deviations in the registration stability or not, the hydraulic-respectively pneumatic-working cylinder 38 is anew either actuated or not.

It is thereby possible to obtain an adjustment of the advancing step distance periodically which serves to, for example, orient the deformed foil band 1a precisely with respect to the punch-out and ejection mechanism 12, 24. Obviously, the photocell 20 can be mounted at other locations along the deep-draw machine.

It can for example become desirable to already obtain an exact adjustment and orientation of the foil band 1 with respect to the forming and molding arrangement 10, when, for example, the foil band 1 have markings thereon which indicate an exact reference position with respect to the formed containers in the deformed foil band 1a.

Similarly, the advancing arrangement of the invention can be combined with an arrangement in accordance with German published application No. 2254715 in such a way that to obtain a registration stability preselected markings are provided on the foil band 1 which coact with an arrangement according to German published application No. 2254715 whereas for a precise guidance of the deformed foil band 1a towards the punch-out and ejection mechanism 12, 24 an advancing arrangement in accordance with this invention is utilized.

Since, as has been mentioned hereinabove, the thermoplastic foil band 1 is made up out of a relatively heterogeneous material which, depending on the pretreatment, during heating and subsequent cooling shrinks in the longitudinal and transverse direction to different degrees, it becomes necessary in particular with a very broad to be processed foil band 1 to provide a control for the advancing arrangement 17 on each side to the foil band 1 and the deformed foil band 1a. In such case there can be provided a photocell 20 in the proximity of both foil band edges whereby each photocell controls a hydraulic-respectively pneumatical-working cylinder 38 which coacts with a swingarm 22. In this manner there is for example possible to work on one side of the deep-draw machine with a constant advancing step whereas on the other side of the machine the advancing step is corrected by means of an advancing mechanism in accordance with this invention.

The actuating element 38, that has been described hereinabove as a hydraulic-respectively pneumatic-working cylinder, can obviously also be constructed in modified ways. For example, this actuating element 38 can consist of an electromagnet with slidably displaceable anchors. Similarly this actuating element 38 can consist of an electromotor which coacts with the actuating lever 36 via a gear rack or a swing lever.

Although the invention is illustrated and described with reference to a plurality of preferred embodiments thereof, it is to be expressly understood that it is in no way limited by the disclosure of such embodiments, but is capable of numerous modifications within the scope of the appended claims.

What is claimed is:

1. In a heat forming machine having molding means and cutting and stamping means arranged successively in downstream fashion, and photocell means operatively mounted in said machine and adapted to scan the indicia on a foil band being transported through said heat forming machine;
   an improved advancing arrangement for the stepwise advancing of the transported foil band having registration indicia along a predetermined path
   said advancing arrangement including clamping means adapted to clampingly hold and release said foil band;
   swing arm means pivotally mounted on said machine;
   a first shaft mounted on the swing arm means in proximity of the free end thereof;
   eccentric bearing means rigidly mounted on said first shaft;
   an actuation lever rigidly secured to said first shaft; and
   a lengthwise adjustable connecting member being pivotally connected at one end to said swing arm means and at the other end to said actuating lever, said lengthwise adjustable connecting member being operatively connected to said photocell means so that its length is adjusted in accordance with the scanning results thereof.

2. In a heat forming machine having molding means and cutting and stamping means arranged successively in downstream fashion, and photocell means operatively mounted in said machine and adapted to scan the indicia on a foil band being transported through said heat forming machine;
   an improved advancing arrangement as set forth in claim 1
   wherein said adjustable connecting member includes a piston and cylinder arrangement.

3. In a heat-forming machine having molding means and cutting and stamping means arranged successively in downstream fashion, and photocell means operatively mounted in said machine and adapted to scan the indicia on a foil band being transported through said heat-forming machine;
   an improved advancing arrangement as set forth in claim 1,
   wherein said advancing arrangement includes a pair of clamping means each of which is adapted to clampingly hold and release a lateral edge of said foil band;
   said swing arm means includes a pair of swing arms coaxially pivotally mounted on said machine;
   each swing arm of said pair of swing arms having a first shaft, eccentric bearing means, lengthwise adjustable connecting member and actuating lever as set forth in claim 1;
   said photocell means comprising a pair of photocells mounted at opposite sides of said foil band, each photocell being operatively connected to a lengthwise adjustable connecting member.

* * * * *